United States Patent [19]

Merkenich et al.

[11] 4,347,258
[45] Aug. 31, 1982

[54] PROCESS FOR THE PREPARATION OF A STABLE FOOD PRODUCT FROM LACTEAL COMPONENTS

[75] Inventors: Karl Merkenich, Rimbach; Wilhelm Koch, Ladenburg; Kaete Glandorf; Gerd Uhlmann, both of Mannheim; Guenther Scheurer, Hassloch, all of Fed. Rep. of Germany

[73] Assignee: Benckiser-Knapsack GmbH, Ladenburg, Fed. Rep. of Germany

[21] Appl. No.: 141,672

[22] Filed: Apr. 18, 1980

[30] Foreign Application Priority Data

Apr. 27, 1979 [DE] Fed. Rep. of Germany ....... 2917086

[51] Int. Cl.³ .................... A23C 20/00; A23C 23/00; A23D 3/02
[52] U.S. Cl. .................................... 426/334; 426/512; 426/580; 426/582; 426/583; 426/586; 426/588; 426/654; 426/657; 426/663
[58] Field of Search ............... 426/334, 534, 573, 580, 426/582, 583, 586, 588, 657, 658, 512, 519, 520, 663, 581, 804, 654

[56] References Cited

U.S. PATENT DOCUMENTS

| | | | |
|---|---|---|---|
| 2,224,720 | 12/1940 | Butterworth et al. | |
| 2,871,127 | 1/1959 | Barch et al. | 426/582 |
| 2,878,126 | 3/1959 | Roberts | 426/586 |
| 3,310,406 | 3/1967 | Webster | |
| 3,397,995 | 8/1968 | Elenbogen | 426/582 X |
| 3,407,075 | 10/1968 | Barker | 426/580 X |
| 3,635,733 | 1/1972 | Kichline et al. | 426/582 X |
| 3,692,630 | 9/1972 | Kichline et al. | 426/582 X |
| 3,780,182 | 12/1973 | Johnson et al. | 426/582 X |
| 4,080,477 | 3/1978 | Tsumura et al. | 426/582 X |
| 4,163,069 | 7/1979 | Melachouris et al. | 426/580 X |
| 4,166,142 | 8/1979 | Chang | 426/582 |

FOREIGN PATENT DOCUMENTS

| | | |
|---|---|---|
| 459972 | 6/1973 | Australia . |
| 2432148 | 1/1976 | Fed. Rep. of Germany . |
| 859518 | 12/1940 | France . |
| 1107958 | 1/1956 | France . |
| 2068674 | 8/1971 | France . |
| 2381474 | 9/1978 | France . |

OTHER PUBLICATIONS

Kosikowski; *Cheese & Fermented Milk Foods*, 1966, pp. 295–300.

*Primary Examiner*—Arthur L. Corbin
*Attorney, Agent, or Firm*—Schwartz, Jeffery, Schwaab, Mack, Blumenthal & Koch

[57] ABSTRACT

A process for the preparation of a stable food product from milk components, comprising the steps of mixing from about 20-40% by weight skim milk powder, from about 0-45% by weight butter fat, and from about 30-80% by weight water with from about 2-6% by weight of a mixture of salts comprising monosodium phosphate, sodium polyphosphate having about 70% $P_2O_5$ and a cross-linked polyphosphate having a pH value of 2.9, in a proportion of approximately 3:4:2; heating the resulting mixture to a temperature of from about 50°–120° C., within about 2-20 minutes under agitation; and recovering the product. Also disclosed is a stable food product in accordance with this process.

14 Claims, No Drawings

PROCESS FOR THE PREPARATION OF A STABLE FOOD PRODUCT FROM LACTEAL COMPONENTS

BACKGROUND OF THE INVENTION

The present invention relates to a process for the preparation of a stable food product from milk components with the use of phosphates.

In the dairy industry, skim milk, whey powder, butter or butter fat and butter oil are increasingly obtained as surplus products, with the marketing thereof often being difficult. There is need for a process to convert these surplus products into a stable form suitable for consumption.

The preparation of food products on the basis of dry milk components without the use of microorganisms has been known for a long time. The starting materials which may be considered for the purpose are milk fat, casein, caseinate, skim milk powder, whey protein, whey powder, vegetable fats, binders, emulsifiers and emulsifying salts.

Heretofore, attempts were made to produce food products from the above-cited group of raw materials in the following ways:

1. by establishing a very high fat content by means of high proportions of milk fat, thus obtaining high-fat spreadable masses having a cream, spread like consistency;
2. using in addition to emulsifying salts, emulsifiers and special binders;
3. using vegetable fats, which are more readily emulsified in recombined products than milk fats; and
4. establishing an extremely high casein or caseinate proportion in the dry matters.

These products in most cases yield fatty sandwich spreads, while a product according to 4. is classified as a processed or soft cheese substitute.

Thus, for example, in DE-OS No. 23 51 035 there is disclosed a sweet, sliceable sandwich covering, containing as essential components approximately 5–30 weight % triglycerides, approximately 5–25 weight % sodium caseinate, up to approximately 3 weight % $Na_3HP_2O_7$, up to approximately 2 weight % mono- and diglycerides, approximately 10–40 weight % sugars and up to 50 weight % water or aqueous liquids. To prepare such a sandwich covering, the triglycerides and emulsifiers are melted together at approximately 50°–70° C., emulsified with an appropriate amount of water and subsequently mixed with the rest of the solids, whereupon the mixture is converted into a homogeneous mass with agitation and heating to approximately 60°–80° C. and placed into a mold for cooling.

Further, in DE-OS No. 28 08 303 there are described a cheese substitute food product and a process for the preparation thereof, whereby a product is obtained containing 25–65 weight % rennet casein, 7.55 weight % of a hydrogenated vegetable oil, 2–12 weight % of a solvating agent based on a citrate or phosphate and suitable flavoring agents and spices, respectively. Such a product is prepared by mixing the components and subsequently heating them to 66°–140° C.

The processes known heretofore begin with a mixture which contains either a relatively high proportion of rennet casein or uses vegetable oil in place of milk fat with the addition of emulsifiers based on mono- or diglycerides, together with thickeners, in order to obtain a homogeneous product of the consistency desired.

SUMMARY OF THE INVENTION

It is therefore one object of the present invention to provide an improved process for preparing a stable food product from milk components.

It is a further object of the invention to provide an improved stable food product produced from surplus milk components.

In accomplishing these objects, there has been provided in accordance with the present invention a process for the preparation of a stable food product from milk components, comprising the steps of mixing from about 20–40% by weight skim milk powder, from about 0–45% by weight butter fat, and from about 30–80% by weight water, with respect to the dry matter, and from about 2–6% by weight of a mixture of salts comprising monosodium phosphate, sodium polyphosphate having about 70% $P_2O_5$ and a cross-linked polyphosphate having a pH value of 2.9, in a proportion of approximately 3:4:2; heating the resulting mixture to a temperature of from about 50°–120° C., within about 2–20 minutes under agitation; and recovering the product. In one embodiment, from about 1–20% and preferably from about 6–10% by weight of the skim milk powder is replaced by whey powder. In a preferred embodiment, the process further includes adding up to 10% by weight of a fruit or sweetening flavoring agent or a mixture thereof to the mixing step or the addition of at least one spicy flavoring agent to the mixing step. Typically, the recovery step comprises pouring the heated mixture into a mold and allowing it to cool.

In accordance with another aspect of the present invention, there has been provided an improved stable food product which is produced from milk components in accordance with the process described above.

Further objects, features and advantages of the present invention will become apparent to the person of ordinary skill in the art from the detailed description of preferred embodiments which follows.

DETAILED DESCRIPTION OF PREFERRED EMBODIMENTS

Surprisingly, it has now become possible to prepare a food product without using the additives discussed above in connection with the prior art. This product may have any desired consistency, extending from sliceable over spreadable to spoonable. About 20–40 weight %, preferably 25–30 weight % skm milk powder, 0–45 weight %, preferably 20–30 weight % butter fat, 30–80 weight % water, and, with respect to the dry mass, 2–6% of a mixture of salts containing sodium phosphate, sodium polyphosphate with 70% $P_2O_5$ and a cross-linked polyphosphate with a content of approx. 70% adjusted to a pH value of 2.9, in a proportion of approximately 3:4:2, are heated in a conventional apparatus for the preparation of processed cheese to temperatures of 80°–120° C., preferably 90°–110° C., over a period of 2–20 minutes.

The base mixture preferably contains pure skim milk powder as its fat-free dry mass, so that all of the calcium and mineral content of fresh milk is preserved in the product. The skim milk powder may be replaced proportionally up to 20% with whey powder, whereby in general, best results are obtained with an addition of 6–10%. If desired, a portion of the skim milk powder up to 10% may be replaced by casein or caseinate.

To the extent that fat-containing products are produced, they contain only milk fat. Preferably, 20–30% butter fat is used, but it is possible to prepare products using more or less butter fat. However, a proportion of 45% by weight should not be exceeded.

As desired and depending on the application, any consistency may be obtained, by varying the dry matter or the fat content, from sliceable to spoonable.

In contrast to vegetable fats used in other milk protein based products, butter fat is substantially more difficult to emulsify when used with rehydrated casein, leading to the danger of oil separation during extended storage periods. For this reason, additional emulsifiers and stabilizers are required. However, with the phosphate mixture employed according to the invention, it is possible to obtain an outstandingly stable emulsion without further additives, even in the presence of large amounts of butter fat.

The storage ability of the food products prepared by the present process is very good. Without an alteration in quality, their minimum stability at 37° C. is 3 months and at room temperature, 6 months. The products are characterized as "storage stable".

As sweetening and fruit flavoring agents there may be added sugar, fruits, fruit extracts and fruit aromas, preserves, honey, chocolate, also vanilla, mocca, etc.. When, however, a product with a spicy flavor is to be produced, a large variety of spices, such as pepper, paprika and additions such as tomatoes, fried onions, olives and cheese flavors, may be used. The amount of such flavoring agents to be added is governed by the intensity of the flavor of the component added.

Even without the addition of flavoring agents, the products obtained according to the examples hereinafter, have a mild, pure, fresh and slightly sweet basic flavor, which, however, may be obtained only by the choice of the specific phosphate mixture.

As shown by experiments, the use of di-, tri- and tetrapolyphosphates yields products having a bitter aftertaste. It is possible to employ conventional processing salts, but the products obtained are not as good in taste, consistency and stability as the products prepared with the phosphate mixture used according to the invention.

The following experimental procedure has been selected for the examples hereinafter:

(a) the mixture to be heated is brought to 95° C. in a melting kettle at an agitator velocity of 120 rpm with direct steam within 15 minutes, homogenized at 300 atm and filled into a mold.

(b) In a high velocity melting cutter, the mixture to be heated is brought to 95° C. within 6 minutes with an agitator velocity of 1,500 rpm, with direct steam, stirred for 3 minutes at 3,000 rpm and subsequently filled into a mold.

As the hydrolyzing agent, a phosphate mixture is used comprised of 33 parts by weight $NaH_2PO_4$, 45 parts by weight sodium polyphosphate having 70% $P_2O_5$ and 22 parts by weight Maddrell salt adjusted to a pH value of 2.9.

All of the examples are heated by methods (a) and (b).

EXAMPLE 1

| 0% fat in dry matter | 600 g skim milk powder |
|---|---|
| 41% dry matter | 24 g phosphate mixture of the above-defined composition |
| | 900 g water (including condensate) |

The product obtained is smooth, slightly translucent and readily spreadable, but does not have the creamy structure of the medium to high fat products.

EXAMPLE 2

| 30% fat in dry matter | 400 g skim milk powder |
|---|---|
| 46% dry matter | 220 g butter fat |
| | 25 g phosphate mixture of the above-defined composition |
| | 750 g water (including condensate) |

The product obtained is readily spreadable.

EXAMPLE 3

| 45% fat in dry matter | 300 g skim milk powder |
|---|---|
| 55% dry matter | 300 g butter fat |
| | 24 g phosphate mixture of the above-defined composition |
| | 500 g water (including condensate) |

The product obtained has a readily spreadable, but slightly elastic consistency.

EXAMPLE 4

| 45% fat in dry matter | 240 g skim milk powder |
|---|---|
| 55% dry matter | 60 g whey powder |
| | 300 g butter fat |
| | 24 g phosphate mixture of the above-defined composition |
| | 500 g water (including condensation) |

The product obtained is creamier than the product of Example 3.

EXAMPLE 5

| 60% fat in dry matter | 200 g skim milk powder |
|---|---|
| 56% dry matter | 400 g butter fat |
| | 24 g phosphate mixture of the above-defined composition |
| | 290 g water (including condensation) |

The product obtained has a very creamy soft consistency and is readily spreadable.

EXAMPLE 6

| 45% fat in dry matter | 300 g casein or caseinate |
|---|---|
| 49% dry matter | 300 g skim milk powder |
| | 600 g butter fat |
| | 48 g phosphate mixture of the above-defined composition |
| | 1,275 g water (including condensate) |

The product obtained has an elastic consistency but is still spreadable.

EXAMPLE 7

| 45% fat in dry matter | 540 g | skim milk powder |
| 20% dry matter | 60 g | whey powder |
| | 600 g | butter fat |
| | 48 g | phosphate mixture of the above-defined composition |
| | 5,000 g | water (including condensation) |

The product obtained contains 3.7% casein. Its consistency is spoonable and has a high gloss.

With this low dry matter content, the product may be made more full-bodied and smoother by the addition of from about 0.1 to 0.8% carboxymethylcellulose or methylcellulose. In general, an addition of from about 0.3 to 0.5% is sufficient.

EXAMPLE 8

| 45% fat in dry matter | 540 g | skim milk powder |
| 63% dry matter | 60 g | whey powder |
| | 600 g | butter fat |
| | 48 g | phosphate mixture of the above-defined composition |
| | 700 g | water (including condensation) |

The product obtained is sliceable.

What is claimed is:

1. A process for the preparation of a stable food product from milk components, comprising the steps of:
    mixing from about 20-40% by weight skim milk powder, from about 0-45% by weight butter fat, and from about 30-80% by weight water with from about 2-6% by weight, based upon the weight of skim milk and butter fat, of a mixture of salts comprising monosodium phosphate, sodium polyphosphate having about 70% $P_2O_5$ and a cross-linked polyphosphate having a pH value of 2.9, in a proportion of approximately 3:4:2;
    heating the resulting mixture to a temperature of from about 50°-120° C., within about 2-20 minutes under agitation in an apparatus for the production of processed cheese; and then
    recovering the product.

2. A process according to claim 1, wherein from about 1-20% by weight of the skim milk powder is replaced by whey powder.

3. A process according to claim 2, wherein from about 6 to 10% by weight of said skim milk powder is replaced by whey powder.

4. A process according to claim 1 or 2, further comprising adding up to 10% by weight of a fruit or sweetening flavoring agent or a mixture thereof to the mixing step.

5. A process according to claim 1 or 2, further comprising adding at least one spicy flavoring agent to the mixing step.

6. A process according to claim 1, wherein from about 25-30% by weight of skim milk powder is added in said mixing step.

7. A process according to claim 1, wherein from about 20-30% by weight of butter fat is added in said mixing step.

8. A process according to claim 1, wherein said mixture is heated to a temperature of from about 90° to 110° C.

9. A process according to claim 1, wherein a portion of said skim milk powder is replaced by casein or caseinate.

10. A process according to claim 1, wherein said recovery step comprises pouring the heated mixture into a mold and allowing it to cool.

11. A process according to claim 1, wherein said cross-linked polyphosphate comprises Maddrell salt.

12. A storage stable food product produced by the process defined by claim 1.

13. A process according to claim 1, wherein said mixing step comprises mixing components consisting essentially of from about 20-40% by weight skim milk powder, from about 0-45% by weight butter fat, and from about 30-80% by weight water, with respect to the dry matter, and from about 2-6% by weight of said mixture of salts.

14. A process according to claim 1, wherein said mixture of salts consists essentially of said salts claimed in claim 1.

* * * * *